US009695773B2

(12) United States Patent
Gibson et al.

(10) Patent No.: US 9,695,773 B2
(45) Date of Patent: Jul. 4, 2017

(54) METHOD AND SYSTEM FOR IMPROVING ENGINE STARTING (71) Applicant: Ford Global Technologies, LLC, Dearborn, MI (US)

(72) Inventors: Alex O'Connor Gibson, Ann Arbor, MI (US); Hong Jiang, Birmingham, MI (US); Jeffrey Allen Doering, Canton, MI (US); John Eric Rollinger, Sterling Heights, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 13/829,407

(22) Filed: Mar. 14, 2013

(65) Prior Publication Data

US 2014/0278018 A1 Sep. 18, 2014

(51) Int. Cl.
*F02D 45/00* (2006.01)
*F02D 41/02* (2006.01)
(Continued)

(52) U.S. Cl.
CPC ........... *F02D 45/00* (2013.01); *B60W 10/026* (2013.01); *B60W 10/06* (2013.01);
(Continued)

(58) Field of Classification Search
CPC ...... B60W 10/06; B60W 10/02; B60W 20/00; B60W 10/023; B60W 2510/0638; B60W 30/18018; B60W 30/192; B60W 10/026; B60W 2030/1809; B60W 20/40; B60W 30/18063; B60W 30/18072; B60W 30/19; B60W 2510/1015; B60W 2510/1025; B60W 2510/105; B60W 2520/105; B60W 2530/16; B60W 2710/023; B60W 2710/024; B60W 2710/025; B60W 2710/027; B60W 2710/0666; B60W 2710/083; B60W 2720/106; B60W 30/18027; F16H 2312/14; F16H 45/02; F16H 61/143; F16H 61/20; F16H 2045/002; F16H 2059/186; F16H 2059/467; F16H 2045/005; F16H 2059/385; F16H 59/14; F02D 41/042; F02D 2200/602; F02D 41/065; F02D 31/001; F02D 41/0225; F02D 41/064; F02D 45/00
(Continued)

(56) References Cited

U.S. PATENT DOCUMENTS 4,548,101 A * 10/1985 Akashi .................... F16H 3/006
74/330
4,773,518 A * 9/1988 Raad ..................... F16D 27/118
192/69.81

(Continued)

*Primary Examiner* — Hung Q Nguyen
*Assistant Examiner* — John Bailey
(74) *Attorney, Agent, or Firm* — Julia Voutyras McCoy Russell LLP (57) ABSTRACT A method and a system for improving operation of an automatically started engine are described. In one example, slip of a disconnect clutch is adjusted to limit an amount of engine torque transferred to vehicle wheels. The method and system adjust disconnect clutch slip in response to transmission input shaft speed and/or engine combustion events.

18 Claims, 4 Drawing Sheets (51) Int. Cl.
| | |
|---|---|
| *F02D 41/06* | (2006.01) |
| *B60W 10/02* | (2006.01) |
| *B60W 10/06* | (2006.01) |
| *B60W 30/192* | (2012.01) |
| *F02N 11/08* | (2006.01) |
| *F02N 19/00* | (2010.01) |

(52) U.S. Cl.
CPC ......... *B60W 30/192* (2013.01); *F02D 41/022* (2013.01); *F02D 41/062* (2013.01); *B60W 2510/1015* (2013.01); *B60W 2710/024* (2013.01); *F02N 11/0814* (2013.01); *F02N 19/00* (2013.01)

(58) Field of Classification Search
USPC ..... 701/112, 113, 67, 84, 87, 90, 95, 51, 79, 701/110; 74/7 R, 7 A, 7 B, 7 C, 7 D, 7 E, 74/8, 9
See application file for complete search history.

(56) References Cited

U.S. PATENT DOCUMENTS

| | | | | | |
|---|---|---|---|---|---|
| 4,784,019 | A * | 11/1988 | Morscheck | ............. | F16H 45/02 192/3.27 |
| 5,243,881 | A * | 9/1993 | Hayashi | ................ | B60W 10/06 123/704 |
| 5,398,508 | A * | 3/1995 | Brown | .................... | F02B 63/00 123/DIG. 8 |
| 5,507,372 | A * | 4/1996 | Boardman | ............ | F16H 61/143 192/3.31 |
| 6,258,001 | B1 * | 7/2001 | Wakuta | .................... | B60K 6/26 192/3.28 |
| 6,258,008 | B1 * | 7/2001 | Tabata | ................... | B60K 6/365 477/107 |
| 6,317,665 | B1 * | 11/2001 | Tabata | ................... | B60K 6/387 180/65.25 |
| 6,616,569 | B2 * | 9/2003 | Hoang | .................... | B60K 6/485 180/65.26 |
| 6,758,788 | B2 * | 7/2004 | Itou | ................... | B60W 30/1819 477/11 |
| 7,896,114 | B2 * | 3/2011 | Colvin | ..................... | B60K 6/48 180/65.28 |
| 7,933,711 | B1 * | 4/2011 | Ulrey | .................... | F02D 41/008 123/179.16 |
| 8,123,656 | B2 * | 2/2012 | Schoenek | ............. | B60K 6/383 180/65.21 |
| 8,131,453 | B2 * | 3/2012 | Ulrey | .................... | F02D 41/008 123/179.16 |
| 9,031,722 | B2 * | 5/2015 | Doering | ................. | B60W 20/10 701/22 |
| 9,108,627 | B2 * | 8/2015 | Gibson | ................. | B60W 10/06 |
| 9,156,469 | B2 * | 10/2015 | Gibson | ................. | B60W 20/40 |
| 2001/0039230 | A1 * | 11/2001 | Severinsky | ............ | B60H 1/004 477/3 |
| 2003/0203790 | A1 * | 10/2003 | Matsubara | ............ | B60W 10/06 477/107 |
| 2004/0063540 | A1 * | 4/2004 | Kondo | .................. | B60W 30/18 477/102 |
| 2005/0011306 | A1 * | 1/2005 | Kirishima | .............. | B60K 17/02 74/661 |
| 2006/0068976 | A1 * | 3/2006 | Tsunekawa | ......... | F16H 61/0028 477/174 |
| 2006/0166789 | A1 * | 7/2006 | Katou | .................. | B60W 10/06 477/167 |
| 2007/0004555 | A1 * | 1/2007 | Berger | ................. | B60W 10/023 477/115 |
| 2007/0026996 | A1 * | 2/2007 | Ayabe | .................. | B60W 10/06 477/107 |
| 2007/0078040 | A1 * | 4/2007 | Nobumoto | ............ | B60W 10/06 477/70 |
| 2007/0084689 | A1 * | 4/2007 | Iwao | ...................... | F16H 41/24 192/3.25 |
| 2008/0083579 | A1 * | 4/2008 | Okuda | .................... | B60K 6/52 180/293 |
| 2008/0242501 | A1 * | 10/2008 | Tsunekawa | ........... | F16H 61/143 477/62 |
| 2009/0070021 | A1 * | 3/2009 | Leone | ................. | F02D 19/0684 701/113 |
| 2009/0071733 | A1 * | 3/2009 | Duan | .................... | B60K 6/365 180/65.21 |
| 2009/0124453 | A1 * | 5/2009 | Seel | ........................ | B60K 6/48 477/5 |
| 2010/0078281 | A1 * | 4/2010 | Kajigai | .................. | B60K 6/365 192/3.28 |
| 2010/0105518 | A1 * | 4/2010 | Kasuya | .................. | B60K 6/387 477/5 |
| 2010/0105519 | A1 * | 4/2010 | Kasuya | .................. | B60K 6/387 477/5 |
| 2010/0174460 | A1 * | 7/2010 | Gibson | ............... | B60W 10/026 701/54 |
| 2010/0174473 | A1 * | 7/2010 | Pursifull | .............. | F02D 41/042 701/112 |
| 2010/0236231 | A1 * | 9/2010 | Miyabe | ............... | F16H 61/0031 60/413 |
| 2010/0250037 | A1 * | 9/2010 | Yoshida | ................. | B60K 6/365 701/22 |
| 2011/0053735 | A1 * | 3/2011 | Lewis | ................. | F02N 11/0803 477/99 |
| 2011/0088990 | A1 * | 4/2011 | Shimizu | ............... | F16H 61/0206 192/85.01 |
| 2011/0098153 | A1 * | 4/2011 | Tsuzuki | ................ | B60W 10/02 477/168 |
| 2011/0098154 | A1 * | 4/2011 | Tsuzuki | ................ | B60W 10/02 477/168 |
| 2011/0136620 | A1 * | 6/2011 | Gibson | ................ | B60W 10/02 477/64 |
| 2011/0237394 | A1 * | 9/2011 | Hirai | ...................... | B60W 10/02 477/167 |
| 2011/0237395 | A1 * | 9/2011 | Shimizu | ............... | F16H 61/0031 477/168 |
| 2011/0239801 | A1 * | 10/2011 | Inagaki | .................. | B60K 6/387 74/473.1 |
| 2012/0010044 | A1 * | 1/2012 | Gibson | ................. | B60W 10/023 477/52 |
| 2012/0010045 | A1 * | 1/2012 | Nedorezov | ......... | B60W 10/023 477/79 |
| 2012/0115679 | A1 * | 5/2012 | Doering | .............. | B60W 10/023 477/70 |
| 2012/0295759 | A1 * | 11/2012 | Fujiwara | ............ | F02N 11/0844 477/167 |
| 2013/0023379 | A1 * | 1/2013 | Bucknor | ............... | B60K 6/48 477/5 |
| 2013/0296136 | A1 * | 11/2013 | Doering | .................. | B60K 6/48 477/167 |
| 2013/0297122 | A1 * | 11/2013 | Gibson | ................. | B60W 20/40 701/22 |
| 2013/0297191 | A1 * | 11/2013 | Gibson | ................. | F02N 11/0855 701/112 |
| 2014/0209059 | A1 * | 7/2014 | Kojima | ................. | B60K 6/48 123/294 |
| 2015/0239468 | A1 * | 8/2015 | Nakanishi | ................ | B60K 6/48 477/167 |

* cited by examiner

METHOD AND SYSTEM FOR IMPROVING ENGINE STARTING

FIELD

The present description relates to a method and system for starting an engine. The method and system may be particularly suitable for improving starting of a port fuel injected engine. However, the method and system may also be utilized in direct injection engines.

BACKGROUND AND SUMMARY

An engine may be periodically automatically stopped without an operator specifically requesting an engine stop. Stopping the engine during low torque demand conditions may conserve fuel. The engine may also be subsequently automatically restarted when an engine torque demand increases to propel a vehicle in which the engine operates. However, if a transmission coupled to the engine is in gear and engine speed is greater than a threshold speed during starting, more than a desired amount of engine torque may be transferred from the engine to vehicle wheels. Therefore, it may be desirable to control engine speed during starting. One way to control engine speed during starting is to retard spark timing. Yet, retarding spark timing may produce a misfire or partial combustion of cylinder gases. Similarly, the engine air fuel ratio may be adjusted leaner to reduce combustion torque and limit engine speed, but the engine may misfire and engine emissions may increase. Further, it may be particularly difficult to control engine speed for a port injected engine during run-up because injected fuel may or may not enter the cylinder.

The inventors herein have recognized the above-mentioned issues and have developed an engine starting method, comprising: starting an engine from stop via rotating the engine; and rotating a torque converter impeller speed from zero speed in response to a first predetermined number of engine combustion events since engine stop via engine torque and at least partially closing a torque converter disconnect clutch from an open state.

By adjusting a disconnect clutch during an engine start according to a number of combustion events since engine stop, it may be possible to limit the amount of engine torque transmitted to vehicle wheels while a transmission is in gear. For example, a disconnect clutch positioned between an engine and a transmission input shaft may be at least partially opened and closed during engine run-up (e.g., the time during engine starting where engine speed exceeds cranking speed and is less than engine idle speed) to limit torque transmitted by the engine to vehicle wheels. In one example, the disconnect clutch may be opened so that torque converter impeller speed does not exceed a threshold speed. In this way, torque transmitted through a transmission may be limited without adjusting combustion in engine cylinders. Consequently, the possibility of engine misfire may be reduced.

The present description may provide several advantages. In particular, the approach may improve engine starting by improving engine speed control during engine starting. Further, the approach may reduce engine emissions. Further still, the approach may improve vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
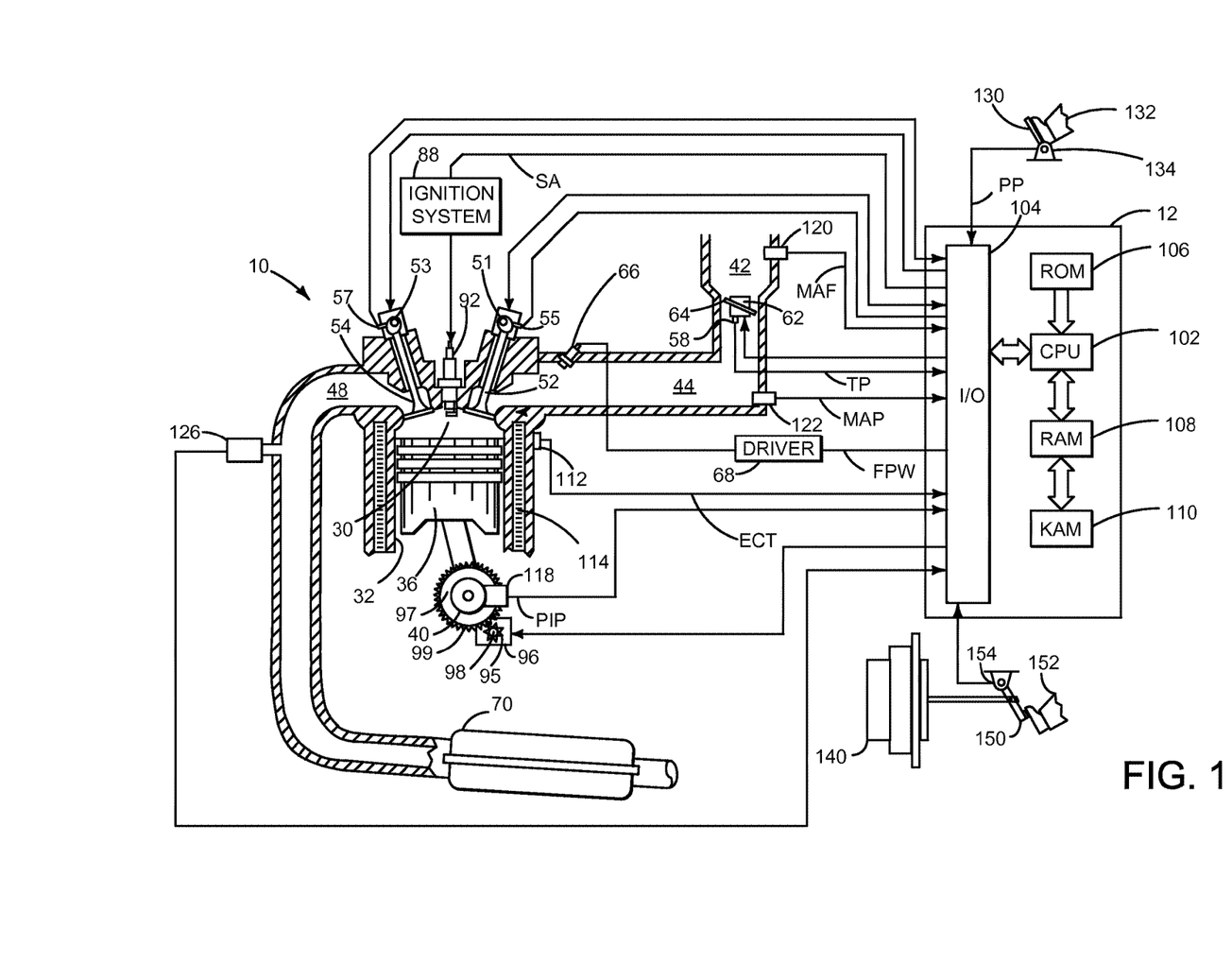
FIG. 1 is a schematic diagram of an engine.
Figure 2:
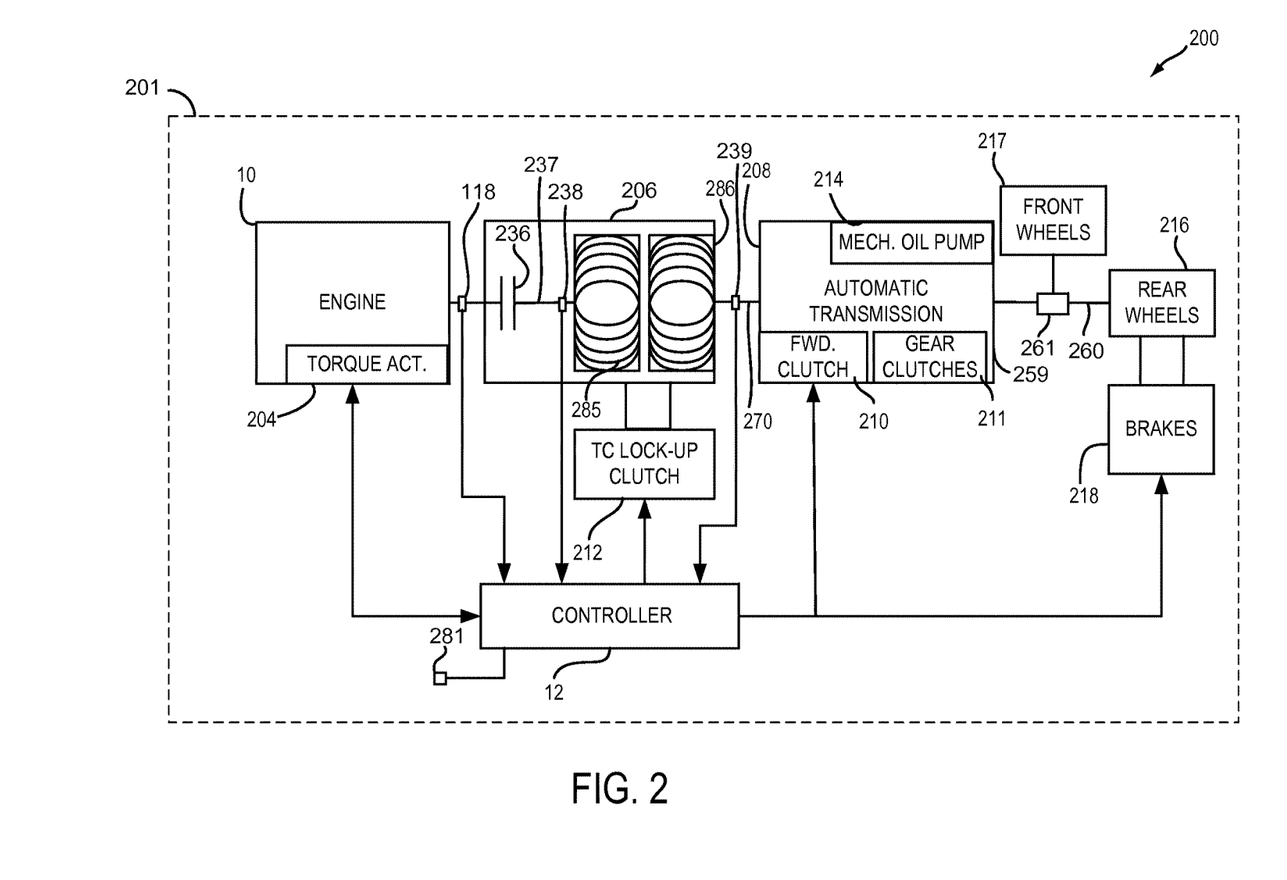
FIG. 2 shows an example vehicle and vehicle driveline configuration.
Figure 3:
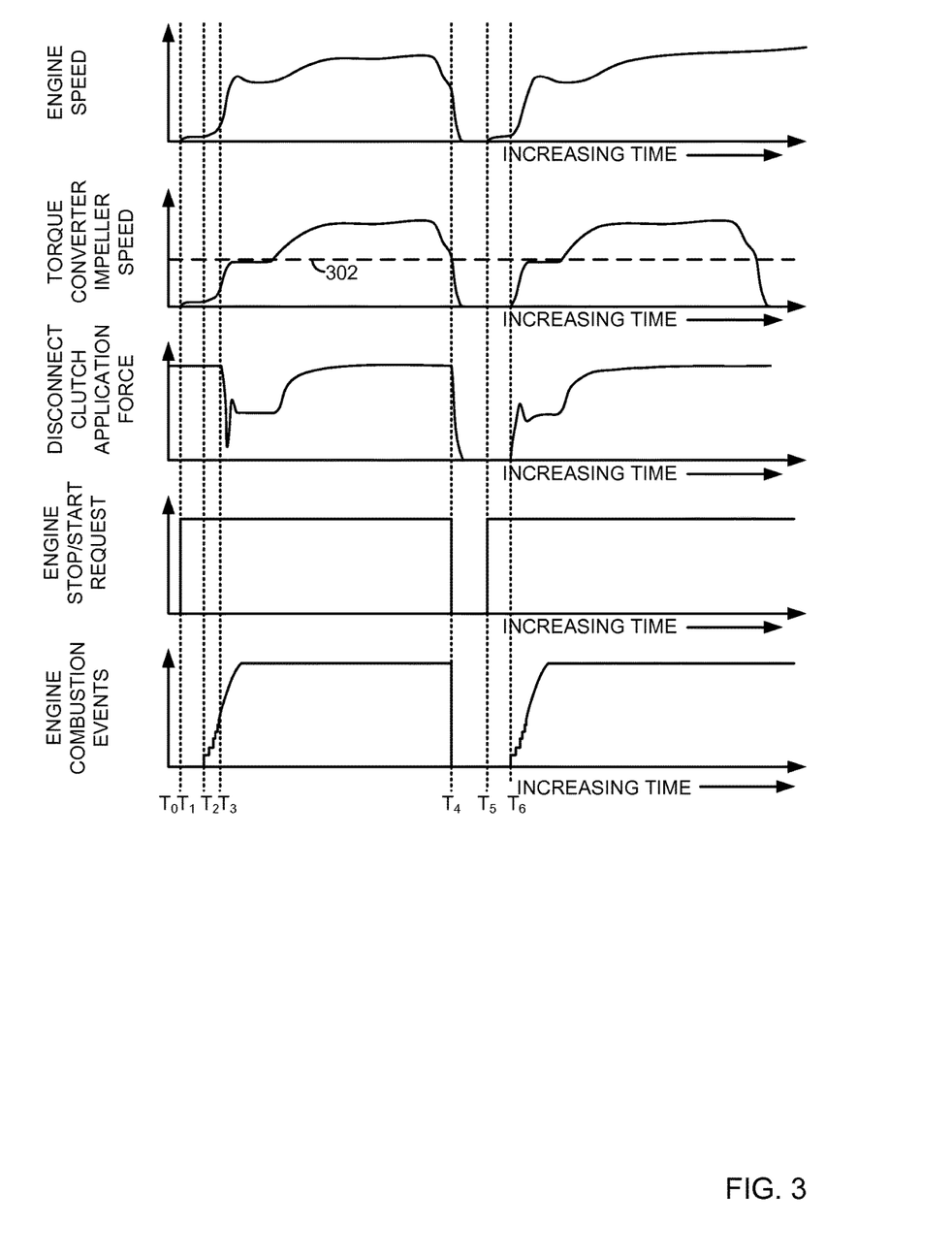
FIG. 3 shows a prophetic engine starting sequence.

The present description is related to controlling a vehicle powertrain. The vehicle may include an engine and disconnect clutch as is shown in FIGS. 1-2. The engine may be started while a transmission is in gear while a disconnect clutch between the engine and a transmission input shaft is open or closed as is shown in FIG. 3. The engine and disconnect clutch may be operated according to the method described in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter motor 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel into an intake port of cylinder 30, which is known to those skilled in the art as port fuel injection. Alternatively, fuel may be injected directly into a cylinder, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with the starter motor shown in FIG. 1. Further, engine 10 may generate or adjust torque via torque actuator 204, such as a fuel injector, throttle, etc.

An engine output torque may be transmitted to an input side of disconnect clutch 236. Engine torque is not transmitted through driveline 200 when disconnect clutch 236 is fully open. Engine torque is transmitted to transmission input shaft 270 when disconnect clutch 236 is fully closed. A portion of engine torque may be transmitted through driveline 200 when disconnect clutch 236 is at least partially closed. Disconnect clutch 236 may be electrically or hydraulically actuated and is shown as part of torque converter 206. However, in some examples, disconnect clutch 236 may be separate from torque converter 206. Engine position sensor 118 measures speed at the input side of disconnect clutch 236. Position sensor 238 senses speed at the output side of disconnect clutch 236.

The downstream side of disconnect clutch 236 is mechanically coupled to the impeller 285 of torque converter 206 via shaft 237. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the transmission torque converter lockup clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (150 in FIG. 1). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine, for example. Thus, the hydraulic pressure generated in mechanical oil pump 214 may increase as an engine speed increases, and may decrease as an engine speed decreases.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. Engine control may be performed on a cylinder-by-cylinder basis to control the engine torque output.

When idle-stop conditions are satisfied, controller 42 may initiate engine shutdown by shutting off fuel and spark to the engine. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate the engine by resuming combustion in engine cylinders.

The system of FIGS. 1 and 2 provides for a vehicle system, comprising: an engine; a torque converter including a disconnect clutch, an impeller, and a turbine, the torque converter in mechanical communication with the engine; a transmission input shaft in mechanical communication with the torque converter; and a controller including executable instructions stored in non-transitory memory, the executable instructions providing for rotating the engine via engine combustion torque and adjusting opening and closing of the disconnect clutch to rotate the impeller via engine combustion torque during engine run-up from zero speed to a threshold speed.

The vehicle system includes where the disconnect clutch is positioned between the engine and the impeller. The system further comprises a torque converter lockup clutch and additional instructions for opening the torque converter lockup clutch during engine starting. The system further comprises additional instructions for adjusting opening and closing the disconnect clutch in response to a number of engine combustion events since engine stop. The system further comprises additional instructions for adjusting opening and closing the disconnect clutch in response to torque converter impeller speed. The system also further comprises additional instructions for automatically restarting the engine.

Referring now to FIG. 3, an example engine starting sequence is shown. The engine starting sequence may be performed via the system shown in FIGS. 1 and 2. The sequence shown in FIG. 3 may be provided by executing instructions according to the method of FIG. 4. Vertical markers at times $T_1$-$T_6$ indicate times of interest in the sequence.

The first plot from the top of FIG. 3 shows engine speed versus time. The Y axis represents engine speed and engine speed increases in the direction of the Y axis arrow. The X axis represents time and time increases from the left hand side of FIG. 3 to the right hand side of FIG. 3.

The second plot from the top of FIG. 3 shows torque converter impeller speed versus time. The Y axis represents torque converter impeller speed and torque converter impeller speed increases in the direction of the Y axis arrow. The X axis represents time and time increases from the left hand side of FIG. 3 to the right hand side of FIG. 3. Horizontal line 302 represents a threshold torque converter impeller speed that is not desirable to exceed during engine starting.

The third plot from the top of FIG. 3 shows disconnect clutch application force versus time. The Y axis represents disconnect clutch application force and disconnect clutch application force increases in the direction of the Y axis arrow. The X axis represents time and time increases from the left hand side of FIG. 3 to the right hand side of FIG. 3. Disconnect clutch application force is a measure of force closing the disconnect clutch.

The fourth plot from the top of FIG. 3 shows an engine stop/start request versus time. The Y axis represents an engine stop/start request. The engine stop/start request is requesting an engine start and run when the signal trace is at a higher level. The engine stop/start request is requesting an engine stop when the signal trace is at a lower level. The X axis represents time and time increases from the left hand side of FIG. 3 to the right hand side of FIG. 3.

The fifth plot from the top of FIG. 3 shows a number of engine combustion events since engine stop versus time. The Y axis represents a number of engine combustion events and the number of engine combustion events increases in the direction of the Y axis arrow. The X axis represents time and time increases from the left hand side of FIG. 3 to the right hand side of FIG. 3. The number of combustion events reaches a counter limit near the Y axis arrow and does not increment after reaching the counter limit.

At time $T_0$, engine speed is zero indicating that the engine is stopped. The engine may be automatically stopped without a driver or operator providing input to a device that has a sole purpose or function of starting and/or stopping the engine (e.g., an ignition switch). In one example, the engine may be automatically stopped in response to driver demand torque being less than a threshold torque. The torque converter impeller speed is also zero since the engine is stopped. The disconnect clutch application force is at a high level indicating that the disconnect clutch is in a closed position. The engine will rotate the torque converter impeller when the disconnect clutch is in a closed position and the engine is rotating. The engine stop/start request is at a lower level indicating that the engine is requested to be stopped. The number of engine combustion events since engine stop is zero.

At time $T_1$, the engine start request transitions to a high level to request an engine start. The engine may be automatically restarted (e.g., the engine is started in response to operating conditions without a driver's input to a device that has a sole purpose or function of starting and/or stopping the engine) in response to operating conditions and the engine stop/start request transitions to a higher level to request the engine restart. The engine is also rotated to cranking speed (e.g., 200-300 RPM) via the starter motor and the torque converter impeller begins to rotate since the driveline disconnect clutch is in a closed state as a result of the higher disconnect clutch application force. The number of engine combustion events remains at zero as the engine begins to be cranked. Spark and fuel are also supplied to the engine as cranking begins. The engine is started while a transmission coupled to the engine is in gear.

At time $T_2$, the first engine combustion event occurs and the combustion events accumulate as the engine begins to run-up (e.g., the time between when the engine exceeds cranking speed and before the engine reaches idle speed). Engine speed begins to increase as does torque converter impeller speed.

At time $T_3$, engine speed and torque converter impeller speed reach threshold speeds and the disconnect clutch application force is reduced in response to engine speed and/or torque converter impeller speed. By reducing the disconnect clutch application force, the disconnect clutch begins to slip so that engine speed is greater than torque converter impeller speed. Disconnect clutch slip may also reduce the amount of engine torque transferred to the torque converter impeller. The disconnect clutch application force is also reduced such that the torque converter impeller speed is limited to less than speed threshold 302. The disconnect clutch application force is adjusted to keep torque converter impeller speed below threshold 302 until engine speed is stabilized at idle speed or until the driver demand torque exceeds a threshold amount of torque.

Between time $T_3$ and time $T_4$, the engine speed and torque converter impeller torque vary in response to driver demand torque (not shown) and disconnect clutch application force. The disconnect clutch application force is adjusted in response to driver demand torque and engine speed during engine starting. The number of engine combustion events reaches a level where the combustion event counter saturates and remains at a threshold count.

At time $T_4$, engine combustion ceases in response to vehicle operating conditions. (e.g., low driver demand torque and zero vehicle speed). The engine stop/start request goes to a lower level to indicate the engine is to be stopped. The engine speed and torque converter impeller speed decelerate to zero speed after combustion in the engine ceases. Additionally, the number of engine combustion events since engine stop is also zeroed. Further, the disconnect clutch is opened in response to the engine stop request. In some examples, the disconnect clutch may be opened when there is an engine stop request while the engine is warm.

At time $T_5$, the engine stop/start request transitions to a higher level to request an automatic engine start in response to vehicle operating conditions (e.g., release of a brake pedal). The engine is started while a transmission coupled to the engine is in gear. The engine is rotated to cranking speed via a starter and the torque converter impeller speed remains at zero since the disconnect clutch application force is near zero and the disconnect clutch is in an open state.

At time $T_6$, the first combustion event in the engine since engine stop occurs and the disconnect clutch application force is increased in response to the first combustion event. In other examples, the disconnect clutch application force may be adjusted in response to a different engine combustion event. For example, the disconnect clutch application force may be adjusted in response to a third combustion event since engine stop. Increasing the disconnect clutch application force begins to close the disconnect clutch, thereby transferring engine torque to the torque converter impeller. The torque converter impeller speed increases toward speed threshold 302. The torque converter application force is reduced as torque converter speed approaches speed threshold 302. By limiting torque converter impeller speed, it may be possible to limit the amount of engine torque that is transmitted to vehicle wheels and improve vehicle drivability.

In this way, the disconnect clutch application force may be adjusted in response to a number of engine combustion events or engine speed to limit the transmission of engine torque to vehicle wheels during engine starting while a transmission coupled to the engine is in gear. Further, the engine may be started with the disconnect clutch engaged or not engaged. In one example, the engine is cranked with the disconnect clutch opened to reduce cranking torque.

Figure 4:
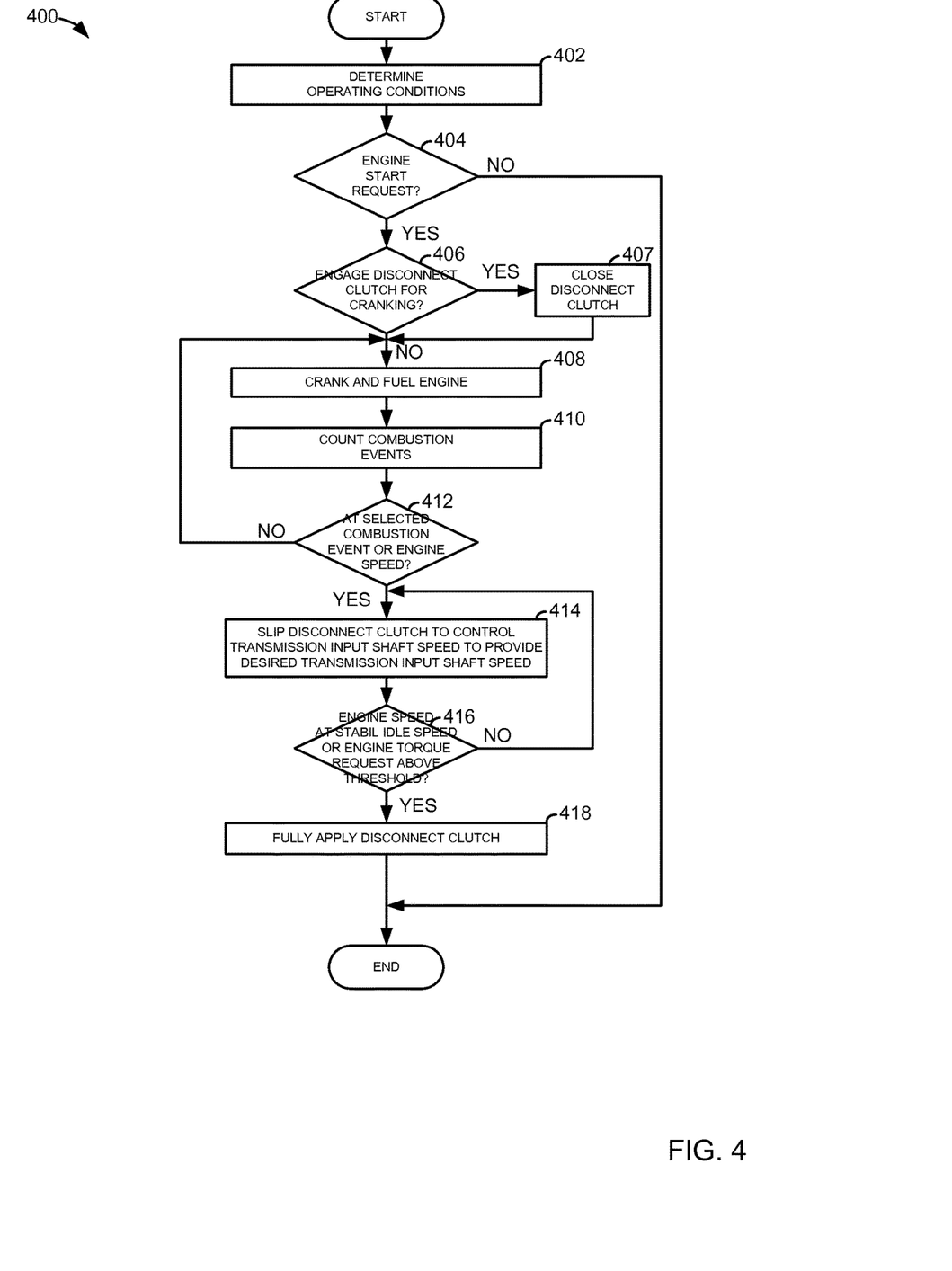
FIG. 4 shows a method for improving engine starting.

Referring now to FIG. 4, a method for starting an engine is shown. The method of FIG. 4 may be provided in the system of FIGS. 1 and 2. The method of FIG. 4 may be stored in non-transitory memory as executable instructions.

At 402, method 400 determines vehicle and engine operating conditions. Operating conditions may include but are not limited to engine speed, vehicle speed, brake pedal position, torque converter impeller speed, torque converter turbine speed, ambient pressure and temperature. Method 400 proceeds to 404 after operating conditions are determined.

At 404, method 400 judges whether or not an engine start request is present. The engine start request may be for an automatic engine start or a driver initiated engine start. An automatic engine start request may be initiated in response to operating conditions such as a release of a brake pedal or an increase in engine demand torque. If method 400 judges that an automatic engine start request is present, the answer is yes and method 400 proceeds to 406. Otherwise, the answer is no and method 400 proceeds to exit.

At 406, method 400 judges whether or not the disconnect clutch is engaged during engine cranking. The disconnect clutch may be open or closed during engine cranking. In one example, the disconnect clutch may be opened at lower engine temperatures and closed at higher engine temperatures. Further, the disconnect clutch may be opened or closed during engine cranking in response to other operating conditions. If the disconnect clutch is to be engaged during engine cranking, the answer is yes and method 400 proceeds to 407. Otherwise, the answer is no and method 400 proceeds to 408.

At 407, method 400 closes the disconnect clutch by increasing the disconnect clutch application force. The disconnect clutch application force may be increased electrically or hydraulically. Method 400 proceeds to 408 after the disconnect clutch is closed.

At 408, method 400 rotates the engine to cranking speed via a starter motor. Method 400 also provides fuel and spark to the engine to promote combustion in engine cylinders. Method 400 proceeds to 410 after the engine begins to crank.

At 410, method 400 begins to count combustion events in the engine. Method 400 may count combustion events based on spark and fuel supplied to engine cylinders. For example, if cylinder number one is provided fuel, combustion in the cylinder may be counted after spark is delivered to cylinder number one. In other examples, combustion in the cylinder may be determined via pressure sensors and combustion events may be counted based on cylinder pressure profiles.

Method 400 proceeds to 412 after counting of combustion events in engine cylinders is started.

At 412, method 400 judges whether engine speed is at a threshold speed or if a predetermined number of combustion events have occurred since engine stop in the engine. In some examples, method 400 may judge whether or not torque converter turbine speed is greater than a threshold speed. In other examples, method 400 may judge whether or not torque converter impeller speed is at a threshold speed. In still other examples, method 400 may judge if either engine speed and/or torque converter impeller speed are at threshold speeds. If so the answer is yes, and method 400 proceeds to 414. Otherwise, the answer is no and method 400 returns to 408.

At 414, method 400 adjusts disconnect clutch application force to control transmission input shaft speed. In one example, disconnect clutch application force is reduced to allow the disconnect clutch to slip so that less engine torque is transmitted to the torque converter impeller. If the disconnect clutch is in an open state during cranking, the disconnect clutch application force is increased to increase torque converter impeller speed. When torque converter impeller speed reaches a threshold speed or a predetermined number of engine combustion events since engine stop, disconnect clutch application force is reduced so that the disconnect clutch slips and limits engine torque transmitted to vehicle wheels. Alternatively, the disconnect clutch may be at least partially opened when transmission input shaft speed reaches a threshold speed to limit transmission input shaft speed to less than a threshold speed. Disconnect clutch application force may be adjusted responsive to engine speed or torque converter turbine speed in a similar manner. By limiting torque converter impeller speed, it may be possible to limit the amount of engine torque that is transmitted to vehicle wheels. Method 400 proceeds to 416 after disconnect clutch application force is adjusted.

At 416, method 400 judges whether engine speed is stabilized at a desired engine idle speed or if an engine demand torque exceeds a threshold torque. If so, the answer is yes and method 400 proceeds to 418. Otherwise, the answer is no and method 400 returns to 414.

At 418, method 400 increases disconnect clutch application force and fully closes the disconnect clutch. The disconnect clutch is closed to allow engine torque to be transmitted to the transmission and vehicle wheels without disconnect clutch slip. Fully closing the disconnect clutch increases efficiency of torque transfer across the disconnect clutch. Method 400 proceeds to exit after the disconnect clutch is closed.

In this way, operation of a disconnect clutch may be adjusted to control the transfer of engine torque to vehicle wheels. Further, combustion stability in engine cylinders may be improved since spark timing and lean air-fuel mixtures may not be necessary to limit transfer of torque to vehicle wheels.

The method of FIG. 4 provides for an engine starting method, comprising: starting an engine from stop via rotating the engine; and rotating a torque converter impeller speed from zero speed in response to a first predetermined number of engine combustion events since engine stop via engine torque and at least partially closing a torque converter disconnect clutch from an open state. The method includes where the engine is rotated via a starter that selectively engages the engine.

In some examples, the method further comprises at least partially opening the torque converter disconnect clutch in response to a second predetermined number of engine combustion events. The method further comprises at least partially opening the torque converter disconnect clutch in response to a predetermined transmission input shaft speed. The method also includes where the disconnect clutch is mechanically coupled to the engine without any torque producing device positioned between the engine and the disconnect clutch. The method further comprises limiting speed of the transmission input shaft to less than a predetermined speed during engine run-up. The method also includes where the engine is automatically restarted.

In another example, the method of FIG. 4 provides for an engine starting method, comprising: starting an engine from stop via rotating the engine; and rotating a transmission input shaft from zero speed during starting the engine and at least partially opening a closed torque converter disconnect clutch in response to transmission input shaft speed. The method further comprises opening a torque converter lockup clutch. The method includes where the torque converter disconnect clutch is positioned between the engine and a torque converter impeller.

The method further comprises opening the closed torque converter disconnect clutch in response to engine speed. The method includes where the engine is rotated via a starter motor that is selectively coupled to the engine. The method also includes where the torque converter disconnect clutch is positioned between a torque converter impeller and the engine. The method further comprises limiting a speed of the transmission input shaft to a threshold speed during engine run-up.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine starting method, comprising:
    starting an engine from stop by rotating the engine via a starter and with a torque converter disconnect clutch in an open state; and
    rotating a torque converter impeller speed from zero speed in response to an occurrence of a first predetermined number of engine combustion events since engine stop via engine torque and partially closing the torque converter disconnect clutch from the open state, where the engine is mechanically coupled to a torque converter impeller via the torque converter disconnect clutch, and no engine torque is transmitted to the impeller when the torque converter disconnect clutch is open.

2. The method of claim 1, where the starter selectively engages the engine.

3. The method of claim 1, further comprising partially opening the torque converter disconnect clutch in response to a second predetermined number of engine combustion events.

4. The method of claim 1, further comprising partially opening the torque converter disconnect clutch in response to a predetermined transmission input shaft speed.

5. The method of claim 1, where the torque converter disconnect clutch is mechanically coupled to the engine without any torque producing device positioned between the engine and the torque converter disconnect clutch.

6. The method of claim 1, further comprising limiting speed of a transmission input shaft to less than a predetermined speed during engine run-up.

7. The method of claim 1, where the engine is automatically restarted.

8. An engine starting method, comprising:
starting an engine from stop via rotating the engine;
rotating a torque converter impeller from zero speed with a closed disconnect clutch during starting the engine; and
slipping the disconnect clutch by partially opening the closed disconnect clutch in response to torque converter impeller speed, where the engine is mechanically coupled to the torque converter impeller via the disconnect clutch, and no engine torque is transmitted to the impeller when the torque converter disconnect clutch is open.

9. The method of claim 8, further comprising opening a torque converter lockup clutch.

10. The method of claim 8, further comprising opening the closed disconnect clutch in response to engine speed.

11. The method of claim 8, where the engine is rotated via a starter motor that is selectively coupled to the engine.

12. The method of claim 8, further comprising fully closing the disconnect clutch in response to an increasing torque demand.

13. The method of claim 12, further comprising limiting a speed of a transmission input shaft to a threshold speed during engine run-up.

14. A vehicle system, comprising:
an engine;
a torque converter including an impeller, the impeller mechanically coupled to the engine via a disconnect clutch, and a turbine, the torque converter in mechanical communication with the engine, wherein no engine torque is transmitted to the impeller when the torque converter disconnect clutch is open;
a transmission input shaft in mechanical communication with the torque converter; and
a controller including executable instructions stored in non-transitory memory, the executable instructions providing for rotating the engine via engine combustion torque and adjusting opening and closing of the disconnect clutch to partially open and close to rotate the impeller via a torque lower than an engine combustion torque during engine run-up from zero speed to a threshold speed.

15. The system of claim 14, further comprising a torque converter lockup clutch and additional instructions for opening the torque converter lockup clutch during engine starting.

16. The system of claim 14, further comprising additional instructions for adjusting opening and closing the disconnect clutch in response to a number of engine combustion events since engine stop.

17. The system of claim 14, further comprising additional instructions for adjusting opening and closing the disconnect clutch in response to torque converter impeller speed.

18. The system of claim 14, further comprising additional instructions for automatically restarting the engine.

* * * * *